(12) United States Patent
Nakamura et al.

(10) Patent No.: US 6,511,564 B2
(45) Date of Patent: *Jan. 28, 2003

(54) METHOD FOR PRODUCING CERAMIC SLURRY, CERAMIC GREEN SHEET, AND FABRICATING MONOLITHIC CERAMIC ELECTRONIC COMPONENT

(75) Inventors: Ichiro Nakamura, Kusatsu (JP); Hiroyuki Kurihara, Omihachiman (JP)

(73) Assignee: Murata Manufacturing Co. Ltd. (JP)

( * ) Notice: Subject to any disclaimer, the term of this patent is extended or adjusted under 35 U.S.C. 154(b) by 90 days.

This patent is subject to a terminal disclaimer.

(21) Appl. No.: 09/727,234

(22) Filed: Nov. 30, 2000

(65) Prior Publication Data

US 2001/0002606 A1 Jun. 7, 2001

(30) Foreign Application Priority Data

Dec. 3, 1999 (JP) .................................. 344902

(51) Int. Cl.⁷ ...................... B32B 31/26; C04B 35/622; B01F 13/06; B02C 17/00; B28C 1/04
(52) U.S. Cl. ................ 156/89.16; 156/89.12; 264/615; 501/1; 501/94; 241/16
(58) Field of Search ............. 156/89.12, 89.14, 156/89.16, 246; 264/614, 615, 616, 617, 669, 670; 501/1, 94; 241/15, 16

(56) References Cited

U.S. PATENT DOCUMENTS 4,836,966 A * 6/1989 Shimuzu et al.
5,852,076 A * 12/1998 Serafin et al.
5,967,964 A * 10/1999 Hattori et al.

FOREIGN PATENT DOCUMENTS

| EP | 0 766 997 | * 4/1997 |
| GB | 2 063 695 | * 6/1981 |
| JP | 4-263902 | * 9/1992 |
| JP | 9-157033 | * 6/1997 |
| JP | 11-99514 | * 4/1999 |

* cited by examiner

Primary Examiner—Curtis Mayes
(74) Attorney, Agent, or Firm—Dickstein, Shapiro, Morin & Oshinsky, LLP (57) ABSTRACT

A method for producing a ceramic slurry used for fabricating a ceramic electronic component includes a mixing and pulverizing step for mixing and pulverizing a ceramic powder having an average particle size of about 0.01 to 1 $\mu$m, a solvent and a dispersant by a dispersion process using a pulverizing medium, such as balls or beads, to obtain a mixed and pulverized slurry; and a high pressure dispersion step for performing high pressure dispersion at a pressure of about 100 kg/cm² or more after a filtered binder solution is added to the mixed and pulverized slurry to obtain a dispersed slurry (final dispersed slurry), the filtered binder solution being prepared by dissolving a binder in a solvent, followed by filtration. A method for forming a ceramic green sheet and a method for fabricating a monolithic ceramic electronic component using the ceramic slurry are also disclosed.

20 Claims, 2 Drawing Sheets

METHOD FOR PRODUCING CERAMIC SLURRY, CERAMIC GREEN SHEET, AND FABRICATING MONOLITHIC CERAMIC ELECTRONIC COMPONENT

BACKGROUND OF THE INVENTION

1. Field of the Invention

The present invention relates to a method for producing a ceramic slurry used for fabricating ceramic electronic components, such as monolithic ceramic capacitors and multilayered ceramic substrates, to a method for forming a ceramic green sheet using the ceramic slurry, and to a method for fabricating a monolithic ceramic electronic component using the ceramic slurry.

2. Description of the Related Art

A monolithic ceramic electronic component, such as a monolithic ceramic capacitor or a multilayered ceramic substrate, is usually fabricated by laminating ceramic green sheets, followed by press-bonding and the performance of a heat treatment to sinter the ceramic and electrodes.

Figure 1:
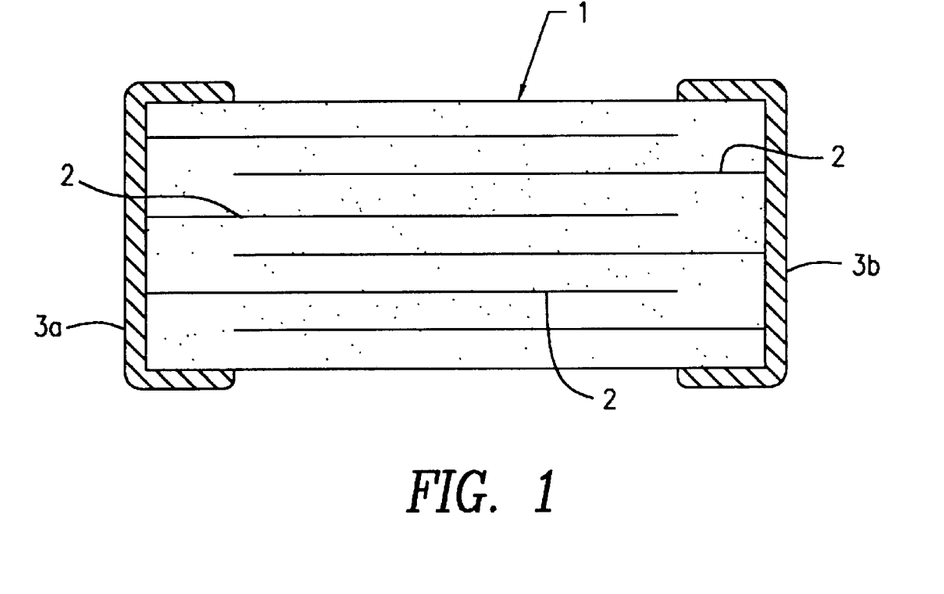
FIG. 1 is a sectional view which shows the structure of a monolithic ceramic capacitor fabricated by laminating ceramic green sheets.

For example, in order to fabricate a monolithic ceramic capacitor as shown in FIG. 1 having a structure in which internal electrodes 2 are arranged in a ceramic element 1 and in which a pair of external electrodes 3a and 3b are arranged on both sides so as to be electrically connected to the internal electrodes 2 which are alternately extended to one side and the other side of the ceramic element 1, the method described below is typically used.

First, a sheet 11 provided with an electrode (refer to FIG. 2) is formed by arranging an internal electrode for forming capacitance on a ceramic green sheet.

Figure 2:
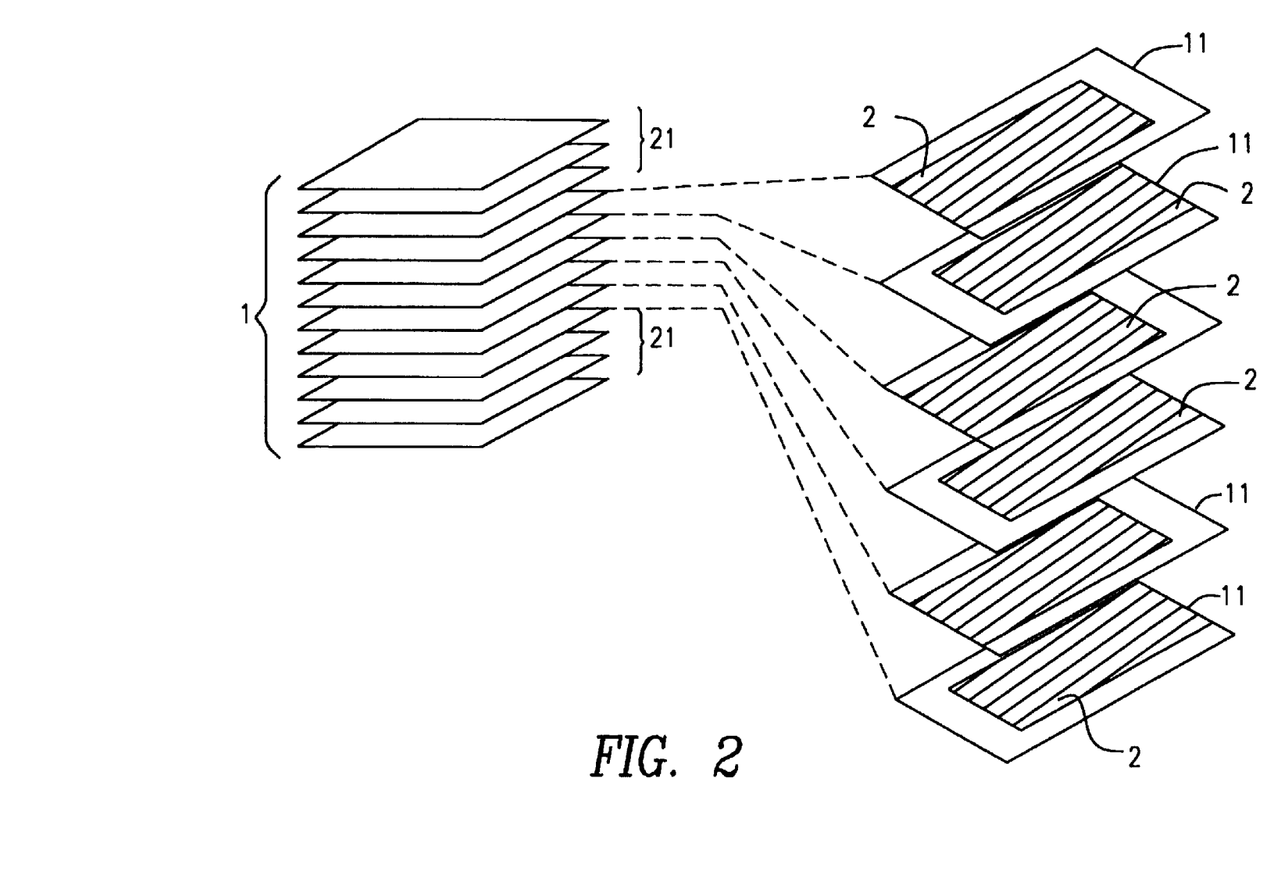
FIG. 2 is a schematic diagram which shows a method for fabricating a monolithic ceramic capacitor.

Next, as shown in FIG. 2, a predetermined number of sheets 11, each provided with an electrode, are laminated together, and ceramic green sheets (sheets for outer layers) 21 which are not provided with an electrode are laminated on the upper and lower surfaces of the laminated sheets 11, and thus a laminate (press-bonded laminate) is formed in which the ends of the individual internal electrodes 2 alternately extend to one side and the other side.

The press-bonded laminate is then fired under predetermined conditions to sinter the ceramic, and a conductive paste is applied to both sides of the sintered laminate (ceramic element) 1 (refer to FIG. 1), followed by baking, to form the external electrodes 3a and 3b which are electrically connected to the internal electrodes 2.

Thus, a monolithic ceramic capacitor as shown in FIG. 1 can be obtained.

Additionally, other monolithic ceramic electronic components, such as monolithic multilayered ceramic substrates, are also fabricating by laminating ceramic green sheets.

A ceramic green sheet used for fabricating a monolithic ceramic electronic component is generally formed by formulating a ceramic powder, a dispersing medium (solvent), a dispersant, a binder, a plasticizer, etc., at predetermined ratios, followed by mixing and pulverizing with a dispersing machine using a pulverizing medium, such as a bead mill, a ball mill, an ATOLITER, a paint shaker or a sand mill, to form a ceramic slurry, and molding the ceramic slurry into a sheet having a predetermined thickness using a doctor blade process or the like, followed by drying.

However, recently, there have been further demands for reduction in size and higher performance with respect to various monolithic ceramic electronic components, such as monolithic ceramic capacitors, as there are with respect to other electronic elements.

Therefore, ceramic green sheets used for fabricating such monolithic ceramic electronic components must be thinner and very thin ceramic green sheets having a thickness of 10 $\mu$m or less have been required.

In the ceramic slurry used for forming such thin ceramic green sheets, the raw material ceramic powder must be sufficiently dispersed. For that purpose, a fine ceramic powder having an average particle size of 0.01 to 1 $\mu$m must be used as the raw material ceramic powder.

In the conventional method for forming a ceramic slurry, in which a ceramic powder, a dispersing medium (solvent), a dispersant, a binder, a plasticizer, etc., are formulated at predetermined ratios, and mixing and pulverizing are performed with a dispersing machine using a pulverizing medium, such as a bead mill, a ball mill, an ATOLITER, a paint shaker or a sand mill, it is difficult to sufficiently disperse a fine ceramic powder having particles of 1 $\mu$m or less, and it is not possible to obtain a slurry which is homogeneously dispersed. Thus, it is difficult to form thin ceramic green sheets of high quality thereby.

That is, the ceramic green sheet formed using the ceramic slurry produced by the conventional method described above has the problems that 1) the surface thereof is not sufficiently smooth; 2) high density cannot be obtained, resulting in insufficient tensile strength; and 3) resins, such as a binder and a plasticizer, are inhomogeneously dispersed, and the shrinkage factor varies locally in the sintering process after lamination, and thus satisfactory dimensional accuracy cannot be obtained. Additionally, such problems are particularly noticeable when a binder having a high degree of polymerization is used.

In the conventional method for forming a ceramic slurry, in order to improve dispersibility, the ceramic powder may be dispersed by forced impact or collision using a ball mill filled with balls or a bead mill filled with beads. In such a case, the pulverizing force due to impact or collision may be excessively large, thus increasing the level of damage to the ceramic powder, resulting in a decrease in the crystallinity of the ceramic powder or an increase in the specific surface. Thus, it may be difficult to obtain a monolithic ceramic electronic component having desired electrical characteristics.

High pressure dispersion may be used in which a slurry containing a ceramic powder is made to flow under high pressure and the ceramic powder is dispersed by impact or collision. However, since the pulverizing force obtained by the high pressure dispersion alone is smaller than the pulverizing force due to forced impact or collision obtained by the dispersion process using a ball mill or a bead mill, it is difficult to sufficiently pulverize strongly clumped particles, and it is not possible to produce a ceramic slurry which is sufficiently dispersed; thus it is not possible to obtain a ceramic green sheet of high quality.

Even if dispersion treatment is performed in any manner, in the case of a thin ceramic green sheet having a thickness of 10 $\mu$m or less, if minute amounts of agglomerated particles, flocculated particles, dust, contamination or bubbles are present, imperfections are generated at the surface of or inside the ceramic green sheet, resulting in problems, such as short circuiting.

SUMMARY OF THE INVENTION

The present invention has been achieved in view of the above, and objects of the present invention are to provide a method for producing a ceramic slurry which is suitable for use in fabricating ceramic electronic components, in which a ceramic powder can be homogeneously dispersed without excessive damage and inclusion of foreign matter can be decreased, to provide a method for forming a ceramic green sheet using the ceramic slurry produced by the above method, and to provide a method for fabricating a monolithic ceramic electronic component using the ceramic slurry.

In one aspect, a method for producing a ceramic slurry used for fabricating a ceramic electronic component in accordance with the present invention includes a mixing and pulverizing step for mixing and pulverizing a ceramic powder having an average particle size of about 0.01 to 1 $\mu$m, a solvent and a dispersant by a dispersion process using a pulverizing medium, such as balls or beads, to obtain a mixed and pulverized slurry; and a high pressure dispersion step for performing high pressure dispersion at a pressure of about 100 kg/cm$^2$ or more after a filtered binder solution is added to the mixed and pulverized slurry to obtain a dispersed slurry (final dispersed slurry), the filtered binder solution being prepared by dissolving a binder in a solvent, followed by filtration.

It is possible to reliably obtain a ceramic slurry in which the ceramic powder is sufficiently dispersed by the above method in which the ceramic powder having an average particle size of about 0.01 to 1 $\mu$m, the solvent, and the dispersant are mixed and pulverized by the dispersion process using the pulverizing medium, such as balls or beads, to prepare the mixed and pulverized slurry, and after the filtered binder solution, which is prepared by dissolving the binder in the solvent, followed by filtration, is added to the mixed and pulverized slurry, dispersion is performed at a high pressure of about 100 kg/cm$^2$ or more.

By dispersing the ceramic powder by combining the dispersion process using the pulverizing medium and the high pressure dispersion process, it is possible to homogeneously disperse the ceramic powder without damaging the crystallinity of the ceramic powder while at the same time inhibiting the specific surface from being excessively increased, and simultaneously, by using the filtered binder solution which is prepared by dissolving the binder in the solvent, followed by filtration, it is possible to reliably remove the undissolved binder, which is likely to generate imperfections, and thus a ceramic slurry suitable for use in fabricating ceramic electronic components, in which occurrence of imperfections is decreased, can be efficiently produced.

In the present invention, "a filtered binder solution prepared by dissolving a binder in a solvent followed by filtration" conceptually includes a solution prepared by dissolving only a binder in a solvent, followed by filtration, and also includes a solution prepared by dissolving a binder together with additives, such as a plasticizer and an antistatic agent, followed by filtration.

In the present invention, "mixing and dispersing a ceramic powder, a solvent, a dispersant and a binder" does not mean that the ingredients of the ceramic slurry are limited only to the ceramic powder, the solvent, the dispersant and the binder; the present invention includes cases in which other additives are also added thereto.

Additionally, in the present invention, "a high pressure dispersion process" conceptually includes a process in which a slurry is dispersed using a high pressure dispersion apparatus which is constructed, for example, so that the slurry is dispersed by impacting a solution to be dispersed under high pressure on the wall or by passing the solution to be dispersed through a tapered channel.

Although the present invention is particularly useful when the ceramic powder has an average particle size (determined by observation with an electron microscope) of about 0.01 to 1 $\mu$m, the present invention is also applicable to cases in which the average particle size is outside the range of about 0.01 to 1 $\mu$m.

In another aspect, in accordance with the present invention, a method for producing a ceramic slurry used for fabricating a ceramic electronic component includes a mixing and pulverizing step for mixing and pulverizing a filtered binder solution, a ceramic powder having an average particle size of about 0.01 to 1 $\mu$m, a solvent and a dispersant by a dispersion process using a pulverizing medium, such as balls or beads, to obtain a mixed and pulverized slurry, the filtered binder solution being prepared by dissolving a binder in a solvent, followed by filtration; and a high pressure dispersion step for dispersing the mixed and pulverized slurry at a pressure of about 100 kg/cm$^2$ or more to obtain a dispersed slurry (final dispersed slurry).

It is also possible to obtain the same effects as those in the method previously described, by a method in which the filtered binder solution prepared by dissolving the binder in the solvent, followed by filtration, the ceramic powder having an average particle size of about 0.01 to 1 $\mu$m, the solvent and the dispersant are mixed and pulverized by the dispersion process using the pulverizing medium, such as balls or beads, to obtain the mixed and pulverized slurry, and then the mixed and pulverized slurry is dispersed at a high pressure of about 100 kg/cm$^2$ or more.

In another aspect, in accordance with the present invention, a method for producing a ceramic slurry used for fabricating a ceramic electronic component includes a mixing and pulverizing step for mixing and pulverizing a ceramic powder having an average particle size of about 0.01 to 1 $\mu$m, a solvent and a dispersant by a dispersion process using a pulverizing medium, such as balls or beads, to obtain a mixed and pulverized slurry; a primary high pressure dispersion step for dispersing the mixed and pulverized slurry at a pressure of about 100 kg/cm$^2$ or more to obtain a primary dispersed slurry; and a secondary high pressure dispersion step for performing high pressure dispersion at a pressure of about 100 kg/cm$^2$ or more after a filtered binder solution is added to the primary dispersed slurry to obtain a secondary dispersed slurry (final dispersed slurry), the filtered binder solution being prepared by dissolving a binder in a solvent, followed by filtration.

It is also possible to homogeneously disperse the ceramic powder without excessively damaging the ceramic powder, and thus a ceramic slurry of high quality can be produced by the method in which the ceramic powder, the solvent and the dispersant are mixed and pulverized by the dispersion process using the pulverizing medium to obtain the mixed and pulverized slurry, the mixed and pulverized slurry is subjected to high pressure dispersion (primary high pressure dispersion) at a pressure of about 100 kg/cm$^2$ or more, and high pressure dispersion (secondary high pressure dispersion) is further performed at a pressure of about 100 kg/cm$^2$ or more.

In another aspect, a method for producing a ceramic slurry used for fabricating a ceramic electronic component in accordance with the present invention includes a primary mixing and pulverizing step for mixing and pulverizing a ceramic powder having an average particle size of about 0.01 to 1 $\mu$m, a solvent and a dispersant by a dispersion process using a pulverizing medium, such as balls or beads, to obtain a primary mixed and pulverized slurry; a secondary mixing and pulverizing step for mixing and pulverizing by a dispersion process using a pulverizing medium, such as balls or beads, after a filtered binder solution is added to the primary mixed and pulverized slurry, to obtain a secondary mixed and pulverized slurry, the filtered binder solution being prepared by dissolving a binder in a solvent, followed by filtration; and a high pressure dispersion step for dispersing the secondary mixed and pulverized slurry at a pressure of about 100 kg/cm² or more to obtain a dispersed slurry (final dispersed slurry).

It is also possible to homogeneously disperse the ceramic powder without excessively damaging the ceramic powder, and thus a ceramic slurry of high quality can be produced by the method in which the ceramic powder, the solvent and the dispersant are mixed and pulverized by the dispersion process using the pulverizing medium to obtain the primary mixed and pulverized slurry, after the filtered binder solution is added to the primary mixed and pulverized slurry, mixing and pulverizing are performed again to obtain the secondary mixed and pulverized slurry, and the secondary mixed and pulverized slurry is dispersed at a high pressure of about 100 kg/cm² or more.

In the method for producing a ceramic slurry in the present invention, the filtered binder solution may be prepared by mixing the solvent and the binder, and performing high pressure dispersion at a pressure of about 100 kg/cm² or more, followed by filtration.

By using the filtered binder solution prepared by mixing the solvent and the binder, and by performing high pressure dispersion at a pressure of about 100 kg/cm² or more, followed by filtration, gels which may be generated when the binder is directly added or when the binder dissolved in the solvent is added without filtration, can be prevented from occurring, and thus the dispersibility of the ceramic powder can be further improved.

In a method for producing the ceramic slurry in the present invention, the filtered binder solution may be prepared by refluxing a binder solution comprising a mixture of the solvent and the binder at about 40 to 100° C., followed by filtration.

By using the filtered binder solution prepared by refluxing the binder solution comprising the mixture of the solvent and the binder at about 40 to 100° C., followed by filtration, the binder can be more reliably dissolved, and the binder can be added without generating imperfections or micrometer-size agglomerates, and it is also possible to improve the dispersibility of the ceramic powder.

In a method for producing the ceramic slurry in the present invention, the filtered binder solution may be prepared by filtering at a filtration cutoff accuracy of about 99% using a filter having pores having a diameter of about 2 µm or less.

By using the filtered binder solution prepared by filtering at a filtration cutoff accuracy of about 99% using the filter having pores having a diameter of about 2 µm or less, it is possible to reliably remove the undissolved binder, thus making the present invention more effective.

Herein, "a filtration cutoff accuracy of about 99%" means that about 99% or more of particles having diameters greater than the predetermined value of filtration cutoff accuracy are captured by a filter, and for example, a method according to the single pass F-2 test based on ANSI B9331-1973 may be mentioned. "Filtering at a filtration cutoff accuracy of about 99% using a filter having pores having a diameter of about 2 µm or less" means that filtration is performed at a filtration cutoff accuracy of about 99%, at a filtration level of about 2 µm or less.

Examples of materials for the filtration film are metals, PTFE, polypropylene and nylon. However, the material for the filtration film is not limited thereto.

As filtration elements, such as a filtration film, used herein, for example, a sheet-type element referred to as a "membrane", an element referred to as a "surface" on which a membrane is arranged, and an element referred to as a "depth" in which a material for a filtration film which is shaped like a thread is wound, may be mentioned. However, the filtration element is not limited thereto.

A filter having one level of filtration cutoff accuracy may be used or a plurality of filters having different levels of filtration cutoff accuracy may be used in sequence. However, the specific use of the filter is not particularly limited.

In the method for producing the ceramic slurry in the present invention, preferably, the ceramic slurry (final dispersed slurry) has a viscosity of about 0.003 to 0.1 Pa·s.

If the viscosity of the dispersed slurry (final dispersed slurry) is set at about 0.003 to 0.1 Pa·s, it is possible to produce a ceramic slurry which is suitable in use for molding into a sheet to produce a ceramic green sheet, thus making the present invention more effective.

Additionally, although the lower viscosity is suitable for forming thinner green sheets, if the viscosity is less than about 0.003 Pa·s, the shape retaining ability is deteriorated and variation in sheet thickness occurs, and thus the viscosity is preferably set in the range of about 0.003 to 0.1 Pa·s.

In the method for producing the ceramic slurry in the present invention, preferably, the dispersion process using the pulverizing medium is a process employing either a ball mill or a bead mill.

If the ball mill or the bead mill is employed in the dispersion process using the pulverizing medium, flocculated ceramic particles can be reliably pulverized, thus making the present invention more effective.

Additionally, in the dispersion process of the present invention, a dispersing machine using a pulverizing medium, such as an ATOLITER, a paint shaker or a sand mill, may be used instead of the ball mill or bead mill.

In the method for producing the ceramic slurry in the present invention, preferably, an anionic dispersant is used as the dispersant and the amount thereof to be added is set so that the total acid amount of the anionic dispersant is about 10 to 150% of the total base amount of the ceramic powder.

Examples of the anionic dispersant which can be preferably used in the present invention are anionic dispersants containing carboxylates, maleates, sulfonates, phosphates, etc. Examples of the anionic dispersants which can be more preferably used are polycarboxylic acid-type dispersants and polymaleic acid-type dispersants which do not contain metallic ions.

With respect to the content of the anionic dispersant, preferably, the total acid amount of the anionic dispersant is about 10 to 150% of the total base amount of the ceramic powder. If the total acid amount of the anionic dispersant is less than about 10% of the total base amount of the ceramic powder, a satisfactory dispersion effect is not displayed, and even if it exceeds about 150%, the dispersion effect is not significantly improved.

Additionally, the total acid amount of the anionic dispersant and the total base amount of the ceramic powder may be determined by titration or the like.

In the method for producing the ceramic slurry in the present invention, preferably, the ceramic slurry (final dispersed slurry) is used for forming a ceramic green sheet and a material having a particle size greater than the thickness of the ceramic green sheet to be formed is prevented from being present in the ceramic slurry.

By preventing the material having a particle size greater than the thickness of the ceramic green sheet to be formed from being present in the ceramic slurry (final dispersed slurry), when the ceramic green sheet is formed by molding the ceramic slurry into a sheet, it is possible to reliably obtain a ceramic green sheet having superior smoothness and uniformity without protrusions or the like on the surface.

Additionally, "a material having a particle size greater than the thickness of the ceramic green sheet to be formed" means a material in which any one of the maximum length, the maximum thickness and the maximum width exceeds the thickness of the ceramic green sheet. Such a material conceptually includes, for example, a gel substance in addition to a solid and a crystalline substance. Specific examples thereof include dust and contamination in air, an agglomerate composed of a plurality of ceramic particles generated when dispersion is insufficient or generated when dispersed particles are agglomerated again after dispersion.

In order to prevent the material having a particle size greater than the thickness of the ceramic green sheet from being present in the ceramic slurry, such a material may be separated out in advance by a separation method, e.g., filtration or centrifugal separation, or the ceramic slurry may be prepared by formulating the individual ingredients in the state in which such a material is not present.

In another aspect, a method for producing a ceramic slurry in accordance with the present invention includes the step of filtering the ceramic slurry produced by any one of the methods for producing the slurry described above, at a filtration cutoff accuracy of about 99% using a filter having pores having a diameter less than about 5 times the thickness of the ceramic green sheet.

By filtering the ceramic slurry at a filtration cutoff accuracy of about 99% using the filter having pores having a diameter less than about 5 times the thickness of the ceramic green sheet, when the ceramic slurry is molded into a sheet to produce the ceramic green sheet, it is possible to prevent protrusions from occurring in the surface and to avoid decreases in smoothness and uniformity due to the inclusion of a material having a particle size greater than the thickness of the ceramic green sheet to be formed, and a ceramic green sheet having superior smoothness and uniformity can be reliably obtained.

If a material having a particle size greater than the thickness of the ceramic green sheet is present in the ceramic slurry, the material may protrude from the surface of the ceramic green sheet, or the material may remain in the ceramic green sheet, resulting in defects such as short circuiting. However, filtration at a filtration cutoff accuracy of about 99% using the filter having pores having a diameter less than about 5 times the thickness of the ceramic green sheet makes it possible to reliably remove such a material.

Herein, "a filtration cutoff accuracy of about 99%" means that about 99% or more of particles having sizes greater than the predetermined value of filtration cutoff accuracy are captured by a filter.

"Filtration at a filtration cutoff accuracy of about 99% using a filter having pores having a diameter less than about 5 times the thickness of the ceramic green sheet" means that, for example, when the ceramic green sheet has a thickness of 2 $\mu$m, filtration is performed at a filtration cutoff accuracy of 99%, at a filtration level of 10 $\mu$m or less.

Additionally, in the present invention, filtration at a filtration cutoff accuracy of about 99% using a filter having pores having a diameter less than the thickness of the ceramic green sheet is not essential, and filtration at a filtration cutoff accuracy of about 99% using the filter having pores having a diameter less than about 5 times the thickness of the ceramic green sheet is sufficient. The present inventor has confirmed from various tests repeatedly conducted, that substantially all the materials having a particle size greater than the thickness of the ceramic green sheet can be removed by filtration at a filtration cutoff accuracy of about 99% using a filter having pores having a diameter less than about 5 times the thickness of the ceramic green sheet.

Additionally, the filtration cutoff accuracy of about 99% is preferably from about 3 times the average particle size of the ceramic powder to about 3 times the thickness of the ceramic green sheet. Thereby, it is possible to reliably remove materials having a particle size greater than the thickness of the ceramic green sheet and the time required for the filtration process can be decreased, thus improving productivity.

Examples of a material for the filtration film are metals, PTFE, polypropylene and nylon. However, the material for the filtration film is not limited thereto. With respect to filtration elements, for example, a sheet-type element referred to as a "membrane", an element referred to as a "surface" on which a membrane is arranged, and an element referred to as a "depth" in which a material for a filtration film which is shaped like a thread is wound, may be mentioned. However, the filtration element is not limited thereto.

A filter having one level of filtration cutoff accuracy may be used or a plurality of filters having different levels of filtration cutoff accuracy may be used in sequence. However, the specific use of the filter is not particularly limited.

Additionally, in a more preferable example, first, a depth-type filter is used as a first filter and then a membrane-type or surface-type filter is used as a second filter, in which the level of filtration cutoff accuracy of the second filter is set higher than that of the first filter. Thus, in the primary filtration process in which the amount of material to be collected per filter is greater, most of the materials are removed by the depth-type filter with high volume treating capacity, and in the secondary filtration process in which the amount of material to be collected is small, it is possible to perform filtration with higher accuracy using the membrane-type or surface-type filter having the higher level of filtration cutoff accuracy.

In another aspect, a method for forming a ceramic green sheet having a thickness of about 0.1 to 10 $\mu$m in accordance with the present invention includes the step of molding the ceramic slurry produced by any one of the methods described above into a sheet on a predetermined base.

In the ceramic slurry produced by any one of the methods described above, a ceramic powder having an average particle size of about 0.01 to 1 $\mu$m is sufficiently dispersed in the dispersing medium, and by molding the ceramic slurry into a sheet, it is possible to reliably form a thin ceramic green sheet of high quality (about 0.1 to 5 $\mu$m thick). That is, it is possible to obtain a ceramic green sheet having superior surface smoothness, high density and high tensile strength, in which resins, such as a binder and a plasticizer, are homogeneously dispersed and which is suitable for use in fabricating a monolithic ceramic electronic component.

When a monolithic ceramic electronic component is fabricated using the ceramic green sheet, it is possible to obtain a highly reliable monolithic ceramic electronic component of high quality having desired characteristics.

In another aspect, a method for fabricating a monolithic ceramic electronic component in accordance with the present invention includes the steps of forming ceramic green sheets using a ceramic slurry produced by any one of the methods described above, laminating the ceramic green sheets together with internal electrodes composed of a base metal, followed by dicing and firing, and forming external electrodes.

By forming ceramic green sheets using the ceramic slurry produced by the method of the present invention, laminating the ceramic green sheets together with internal electrodes composed of a base metal, followed by cutting and firing, and forming external electrodes, it is possible to obtain a reliable monolithic ceramic electronic component of high quality having desired characteristics.

DESCRIPTION OF THE PREFERRED EMBODIMENTS

The characteristics of the present invention will be described in detail based on embodiments of the present invention.

In the present invention, there are no specific limitations on the type or the composition of the ceramic powder to be used, and the present invention is applicable to ceramic slurries using various types of ceramic powder, e.g., dielectric ceramic powders, such as a barium titanate-based ceramic powder, a strontium titanate-based ceramic powder and a lead titanate-based ceramic powder; magnetic ceramic powders, such as a ferritic ceramic powder; piezoelectric ceramic powders; and insulating ceramic powders, such as alumina and silica.

With respect to the particle size of the ceramic powder, basically, particles passing through a high pressure dispersing apparatus can be used without any problems. However, the present invention is most effective when applied to a fine ceramic powder, having an average particle size of about 0.01 to 1 $\mu$m determined by observation with an electron microscope, which is believed to be difficult to disperse in the conventional dispersion method.

The ceramic powder may contain additives and impurities. For example, when the ceramic powder contains barium titanate as a principal ingredient, the ceramic powder may contain glass, magnesium oxide, manganese oxide, rare-earth oxides, calcium oxide, etc., as additives.

In the present invention, there are no specific limitations on the type of the solvent (dispersing medium), and for example, aromatic solvents, such as toluene and xylene, and alcohol solvents, such as ethyl alcohol isopropyl alcohol, and butyl alcohol, may be used. The solvents described above may be used alone or in combination. As the solvent (dispersing medium), another organic solvent may be further used, and water may be used.

There are also no specific limitations on the dispersant which can be used in the present invention, and various types of dispersant, such as carboxylates, sulfonates and phosphates, may be used. As preferable examples of the dispersant, nonionic polycarboxylic acid-type dispersants which do not contain metallic ions may be mentioned.

As the binder, a polyvinyl butyral resin, a cellulosic resin, an acrylic resin, a vinyl acetate resin, a polyvinyl alcohol resin or the like may be used, and the type and the amount to be used are appropriately selected depending on the targeted ceramic green sheet.

The ceramic slurry of the present invention may contain a plasticizer. As the plasticizer, various types of plasticizer, such as polyethylene glycol and phthalate ester, may be used appropriately. The amount thereof is selected depending on the targeted ceramic green sheet.

Additionally, the conditions on the ceramic powder, the dispersing medium, the dispersant, the plasticizer, etc., described above are applicable to all the aspects of the present invention.

The present invention will be described below in more detail based on the examples.

EXAMPLE 1

1) First, relative to 100 parts by weight of a commercially available dielectric material having a particle size of 0.2 $\mu$m (i.e., ceramic powder containing additives with an average base amount of 40 $\mu$mol/g), 2 parts by weight of an anionic dispersant having an average acid amount of 960 $\mu$mol/g (manufactured by NOF Corporation), the total acid amount of the dispersant being 48% of the total base amount of the powder, a filtered binder solution prepared by dissolving 10 parts by weight of an acrylic binder in 70 parts by weight of toluene and 70 parts by weight of ethyl alcohol, followed by filtration at a filtration cutoff accuracy of 99% using a filter having pores having a diameter of 1 $\mu$m, and 1.4 parts by weight of dioctyl phthalate (hereinafter referred to as "DOP"), i.e., a phthalate ester, as a plasticizer were formulated, and 500 parts by weight of zirconia balls having a diameter of 2 mm were added thereto.

2) The formulated slurry was mixed and pulverized by a ball mill for 5 hours.

3) The slurry mixed and pulverized by the ball mill was subjected to high pressure dispersion treatment 20 times by a high pressure dispersing apparatus at a pressure of 1,300 kg/cm$^2$, at a treating rate of 300 cc/min to obtain a ceramic slurry (final dispersed slurry) for forming a ceramic green sheet.

The dispersibility of the ceramic slurry thus obtained was evaluated using a Microtrack particle size distribution tester. As a result, the particle diameter of 90% of the total particles measured by the size distribution tester (D90) was 0.45 $\mu$m.

After the ceramic slurry was dried and heated to 500° C. to remove the binder, the specific surface was measured, the original specific surface had been increased by 7.7%.

Next, the ceramic slurry was molded into a sheet by a doctor blade process to form a ceramic green sheet.

The surface roughness (Ra) of the resulting ceramic green sheet was observed using an atomic force microscope, and the ratio of measured density to theoretical density (measured density/theoretical density) was considered the density ratio of the ceramic green sheet. As a result, the surface roughness (Ra) was 61 nm and the density ratio was 0.98.

Next, using the ceramic green sheet, a monolithic ceramic capacitor was fabricated, in which, as shown in FIG. 1, internal electrodes 2 were arranged in a ceramic element 1, and a pair of external electrodes 3a and 3b were arranged on both sides of the ceramic element 1 so as to be electrically connected to the internal electrodes 2 which were alternately extracted to one side and the other side.

The monolithic ceramic capacitor was fabricated by the method described below.

1) First, an Ni paste was screen-printed on the ceramic green sheet formed as described above to form a sheet provided with an electrode for forming capacitance.

2) Next, as shown in FIG. 2, a predetermined number (herein, 70 layers) of sheets 11, each provided with an electrode, were laminated together. On the upper and lower surfaces of the laminated sheets, ceramic green sheets (sheets for outer layers) 21 which were not provided with an electrode were laminated and press-bonded to form a laminate (press-bonded laminate) in which the ends of the individual internal electrodes 2 were alternately extended to one side or the other side.

3) After the press-bonded laminate was cut into a predetermined size by a dicer, binder removal and firing were performed. The binder removal was performed by heat treatment in a nitrogen atmosphere. The firing was performed by heating to a predetermined temperature in a weakly reducing atmosphere.

4) A conductive paste containing silver as a conductive ingredient was applied and baked on both sides of the fired laminate (ceramic element) 1 to form the external electrodes 3a and 3b (refer to FIG. 1) which are electrically connected to the internal electrodes 2.

Thus, a monolithic ceramic capacitor having Ni as the internal electrodes 2 as shown in FIG. 1 was obtained.

The short circuiting rate (the rate of occurrence of short circuiting) of the monolithic ceramic capacitor thus fabricated was measured and a satisfactory rate of 2.8% was obtained. The temperature characteristics of capacitance satisfied X7R.

EXAMPLE 2

1) First, relative to 100 parts by weight of a commercially available dielectric material (containing principal ingredients and additives with an average base amount of 40 $\mu$mol/g) having a particle size of 0.2 $\mu$m, 2 parts by weight of an anionic dispersant having an average acid amount of 960 $\mu$mol/g (manufactured by NOF Corporation), the total acid amount of the dispersant being 48% of the total base amount of the powder, 35 parts by weight of toluene and 35 parts by weight of ethanol were formulated, and 500 parts by weight of zirconia balls having a diameter of 2 mm were added thereto.

2) The formulated slurry was mixed and pulverized using a ball mill for 5 hours.

3) A filtered binder solution which had been prepared by dissolving 10 parts by weight of an acrylic resin-based binder as a binder and 1.4 parts by weight of dioctyl phthalate (DOP), i.e., a phthalate ester, as a plasticizer, into 35 parts by weight of toluene and 35 parts by weight of ethanol, as a solvent, while stirring, followed by filtration at a filtration cutoff accuracy of 99% using a filter having pores having a diameter of 1 $\mu$m, was added to the mixed and pulverized slurry taken out of the ball mill.

4) Next, high pressure dispersion treatment was performed 15 times by a high pressure dispersing apparatus at a pressure of 1,300 kg/cm$^2$, at a treating rate of 300 cc/min to obtain a ceramic slurry (final dispersed slurry) for forming a ceramic green sheet.

The dispersibility of the ceramic slurry thus obtained was evaluated using a Microtrack particle size distribution tester. As a result, D90 was 0.44 $\mu$m.

After the ceramic slurry was dried and heated to 500° C. to remove the binder, the specific surface was measured, and the original specific surface had increased by 7.8%.

Next, the ceramic slurry was molded into a sheet by a doctor blade process to form a ceramic green sheet.

The surface roughness (Ra) of the resulting ceramic green sheet was observed using an atomic force microscope, and the density ratio of measured density to theoretical density (measured density/theoretical density) was found. As a result, Ra was 59 nm and the density ratio was 0.99.

Next, using the ceramic green sheet, a monolithic ceramic capacitor was fabricated.

Since the method for fabricating the monolithic ceramic capacitor was the same as that in Example 1, the description thereof will be omitted in order to avoid duplication.

The short circuiting rate of the resulting monolithic ceramic capacitor was 2.9%, which was satisfactory. The temperature characteristics of capacitance satisfied X7R.

EXAMPLE 3

1) First, relative to 100 parts by weight of a commercially available dielectric material (containing principal ingredients and additives with an average base amount of 40 $\mu$mol/g) having a particle size of 0.2 $\mu$m, 2 parts by weight of an anionic dispersant having an average acid amount of 960 $\mu$mol/g (manufactured by NOF Corporation), the total acid amount of the dispersant being 48% of the total base amount of the powder, 35 parts by weight of toluene and 35 parts by weight of ethanol were formulated, and 500 parts by weight of zirconia balls having a diameter of 2 mm were added thereto.

2) The formulated slurry was mixed and pulverized using a ball mill for 5 hours.

3) The mixed and pulverized slurry was taken out of the ball mill and was subjected to a high pressure dispersion treatment 10 times by a high pressure dispersing apparatus at a pressure of 1,300 kg/cm$^2$, at a treating rate of 300 cc/min to obtain a dispersed slurry (primary dispersed slurry).

4) A filtered binder solution which had been prepared by dissolving 10 parts by weight of an acrylic resin-based binder as a binder and 1.4 parts by weight of a phthalate ester (DOP) as a plasticizer into 35 parts by weight of toluene and 35 parts by weight of ethanol, as a solvent, while stirring, followed by filtration at a filtration cutoff accuracy of 99% using a filter having pores having a diameter of 1 $\mu$m, was added to the primary dispersed slurry.

5) Furthermore, a high pressure dispersion treatment was performed 5 times by a high pressure dispersing apparatus at a pressure of 1,300 kg/cm$^2$, at a treating rate of 300 cc/min to obtain a secondary dispersed slurry (final dispersed slurry) for forming a ceramic green sheet.

The dispersibility of the ceramic slurry (final dispersed slurry) thus obtained was evaluated using a Microtrack particle size distribution tester. As a result, D90 was 0.43 $\mu$m.

After the ceramic slurry was dried and heated to 500° C. to remove the binder, the specific surface was measured, and the increase from the original specific surface was 8.2%.

Next, the ceramic slurry was molded into a sheet by a doctor blade process to form a ceramic green sheet.

The surface roughness (Ra) of the resulting ceramic green sheet was observed using an atomic force microscope, and the density ratio of measured density to theoretical density (measured density/theoretical density) of the ceramic green sheet was found. As a result, Ra was 54 nm and the density ratio was 1.00.

Next, using the ceramic green sheet, a monolithic ceramic capacitor was fabricated in a manner similar to that in Example 1.

The short circuiting rate of the resulting monolithic ceramic capacitor was 2.6%, which was satisfactory. The temperature characteristics of capacitance satisfied X7R.

EXAMPLE 4

1) First, relative to 100 parts by weight of a commercially available dielectric material (containing principal ingredients and additives with an average base amount of 40 $\mu$mol/g) having a particle size of 0.2 $\mu$m, 2 parts by weight of an anionic dispersant having an average acid amount of 960 $\mu$mol/g (manufactured by NOF Corporation), the total acid amount of the dispersant being 48% of the total base amount of the powder, 35 parts by weight of toluene and 35 parts by weight of ethanol were formulated, and 500 parts by weight of zirconia balls having a diameter of 2 mm were added thereto.

2) The formulated slurry was mixed and pulverized using a ball mill for 5 hours.

3) The mixed and pulverized slurry was taken out of the ball mill and was subjected to high pressure dispersion treatment 10 times by a high pressure dispersing apparatus at a pressure of 1,300 kg/cm$^2$, at a treating rate of 300 cc/min to obtain a dispersed slurry (primary dispersed slurry).

4) A filtered binder solution which had been prepared by dissolving 10 parts by weight of an acrylic resin-based binder as a binder and 1.4 parts by weight of a phthalate ester (DOP) as a plasticizer into 35 parts by weight of toluene and 35 parts by weight of ethanol, as a solvent, while stirring, and refluxing was performed at 65° C. for 5 hours, followed by filtration at a filtration cutoff accuracy of 99% using a filter having pores having a diameter of 1 $\mu$m, was added to the primary dispersed slurry.

5) Furthermore, a high pressure dispersion treatment was performed 5 times by a high pressure dispersing apparatus at a pressure of 1,300 kg/cm$^2$, at a treating rate of 300 cc/min to obtain a secondary dispersed slurry (final dispersed slurry) for forming a ceramic green sheet.

The dispersibility of the ceramic slurry (final dispersed slurry) thus obtained was evaluated using a Microtrack particle size distribution tester. As a result, D90 was 0.42 $\mu$m.

After the ceramic slurry was dried and heated to 500° C. to remove the binder, the specific surface was measured, and the increase from the original specific surface was 8.1%.

Next, the ceramic slurry was molded into a sheet by a doctor blade process to form a ceramic green sheet.

The surface roughness (Ra) of the resulting ceramic green sheet was observed using an atomic force microscope, and the density ratio of measured density to theoretical density (measured density/theoretical density) of the ceramic green sheet was found. As a result, Ra was 55 nm and the density ratio was 1.00.

Next, using the ceramic green sheet, a monolithic ceramic capacitor was fabricated in a manner similar to that in Example 1.

The short circuiting rate of the resulting monolithic ceramic capacitor was 1.4%, which was satisfactory. The temperature characteristics of capacitance satisfied X7R.

EXAMPLE 5

1) First, relative to 100 parts by weight of a commercially available dielectric material (containing principal ingredients and additives with an average base amount of 40 $\mu$mol/g) having a particle size of 0.2 $\mu$m, 2 parts by weight of an anionic dispersant having an average acid amount of 960 $\mu$mol/g (manufactured by NOF Corporation), the total acid amount of the dispersant being 48% of the total base amount of the powder, 35 parts by weight of toluene and 35 parts by weight of ethanol were formulated, and 500 parts by weight of zirconia balls having a diameter of 2 mm were added thereto.

2) The formulated slurry was mixed and pulverized using a ball mill for 5 hours.

3) The mixed and pulverized slurry was taken out of the ball mill and was subjected to high pressure dispersion treatment 10 times by a high pressure dispersing apparatus at a pressure of 1,300 kg/cm$^2$, at a treating rate of 300 cc/min to obtain a dispersed slurry (primary dispersed slurry).

4) A filtered binder solution which had been prepared by dissolving 10 parts by weight of an acrylic resin-based binder as a binder and 1.4 parts by weight of a phthalate ester (DOP) as a plasticizer into 35 parts by weight of toluene and 35 parts by weight of ethanol, as a solvent, while stirring, and high pressure dispersion was performed 5 times by a high pressure dispersing apparatus at a pressure of 1,000 kg/cm$^2$, at a treating rate of 300 cc/min, followed by filtration at a filtration cutoff accuracy of 99% using a filter having pores having a diameter of 0.1 $\mu$m, was added to the primary dispersed slurry.

5) Furthermore, a high pressure dispersion treatment was performed 5 times by a high pressure dispersing apparatus at a pressure of 1,300 kg/cm$^2$, at a treating rate of 300 cc/min to obtain a secondary dispersed slurry (final dispersed slurry) for forming a ceramic green sheet.

The dispersibility of the ceramic slurry (final dispersed slurry) thus obtained was evaluated using a Microtrack particle size distribution tester. As a result, D90 was 0.41 $\mu$m.

After the ceramic slurry was dried and heated to 500° C. to remove the binder, the specific surface was measured, and the increase in the original specific surface was 8.2%.

Next, the ceramic slurry was molded into a sheet by a doctor blade process to form a ceramic green sheet.

The surface roughness (Ra) of the resulting ceramic green sheet was observed using an atomic force microscope, and the density ratio of measured density to theoretical density (measured density/theoretical density) of the ceramic green sheet was found. As a result, Ra was 53 nm and the density ratio was 1.00.

Next, using the ceramic green sheet, a monolithic ceramic capacitor was fabricated in a manner similar to that in Example 1.

The short circuiting rate of the resulting monolithic ceramic capacitor was 0.6%, which was satisfactory. The temperature characteristics of capacitance satisfied X7R.

EXAMPLE 6

A ceramic slurry was produced under the same conditions as those in Example 1 apart from the fact that the binder had been changed to polyvinyl butyral.

The dispersibility of the ceramic slurry was evaluated using a Microtrack particle size distribution tester. As a result, D90 was 0.44 $\mu$m.

After the ceramic slurry was dried and heated to 500° C. to remove the binder, the specific surface was measured, and the increase in the original specific surface was 7.8%.

Next, the ceramic slurry was molded into a sheet by a doctor blade process to form a ceramic green sheet.

The surface roughness (Ra) of the resulting ceramic green sheet was observed using an atomic force microscope, and the density ratio of measured density to theoretical density (measured density/theoretical density) was found. As a result, Ra was 60 nm and the density ratio was 0.99.

Next, using the ceramic green sheet, a monolithic ceramic capacitor was fabricated in a manner similar to that in Example 1.

The short circuiting rate of the resulting monolithic ceramic capacitor was 2.8%, which was satisfactory. The temperature characteristics of capacitance satisfied X7R.

EXAMPLE 7

A ceramic slurry was produced under the same conditions as those in Example 6 apart from the fact that each of toluene and ethanol was formulated in the amount of 80 parts by weight.

The dispersibility of the ceramic slurry was evaluated using a Microtrack particle size distribution tester. As a result, D90 was 0.45 μm. At this stage, the slurry had a viscosity of 0.008 Pa·s.

After the ceramic slurry was dried and heated to 500° C. to remove the binder, the specific surface was measured, and the increase of the original specific surface was 7.7%.

Next, the ceramic slurry was molded into a sheet by a doctor blade process to form a ceramic green sheet.

The surface roughness (Ra) of the resulting ceramic green sheet was observed using an atomic force microscope, and the density ratio of measured density to theoretical density (measured density/theoretical density) of the ceramic green sheet was found. As a result, Ra was 61 nm and the density ratio was 0.98.

Next, using the ceramic green sheet, a monolithic ceramic capacitor was fabricated in a manner similar to that in Example 1.

The short circuiting rate of the resulting monolithic ceramic capacitor was 2.9%, which was satisfactory. The temperature characteristics of capacitance satisfied X7R.

EXAMPLE 8

A ceramic slurry was produced in a manner similar to that in Example 1 apart from the fact that the amount of the dispersant added had been changed from 2 parts by weight to 6 parts by weight, the total acid amount of the dispersant being 144% of the total base amount of the powder.

The dispersibility of the ceramic slurry was evaluated using a Microtrack particle size distribution tester. As a result, D90 was 0.43 μm. After the ceramic slurry was dried and heated to 500° C. to remove the binder, the specific surface was measured, and the increase from the original specific surface was 6.1%.

Using the ceramic slurry, a ceramic green sheet was formed in a manner similar to that in Example 1.

The surface roughness (Ra) of the resulting ceramic green sheet was 55 nm and the density ratio was 1.00.

Next, using the ceramic green sheet, a monolithic ceramic capacitor was fabricated in a manner similar to that in Example 1.

The short circuiting rate of the resulting monolithic ceramic capacitor was 1.2%, which was satisfactory. The temperature characteristics of capacitance satisfied X7R.

EXAMPLE 9

A ceramic slurry was produced in a manner similar to that in Example 1 apart from the fact that the amount of the dispersant added had been changed from 2 parts by weight to 0.5 part by weight, the total acid amount of the dispersant being 12% of the total base amount of the powder.

The dispersibility of the ceramic slurry thus obtained was evaluated using a Microtrack particle size distribution tester. As a result, D90 was 0.47 μm. After the ceramic slurry was dried and heated to 500° C. to remove the binder, the specific surface was measured, and the increase in the original specific surface was 9.2%.

Using the ceramic slurry, a ceramic green sheet was formed in a manner similar to that in Example 1.

The surface roughness (Ra) of the resulting ceramic green sheet was 66 nm and the density ratio was 0.97.

Next, using the ceramic green sheet, a monolithic ceramic capacitor was fabricated in a manner similar to that in Example 1.

The short circuiting rate of the resulting monolithic ceramic capacitor was 1.7%, which was satisfactory. The temperature characteristics of capacitance satisfied X7R.

COMPARATIVE EXAMPLE 1

In Example 1, the filtered binder solution was prepared by dissolving 10 parts by weight of the acrylic binder into the solvent (70 parts by weight of toluene and 70 parts by weight of ethyl alcohol), followed by filtration at a filtration cutoff accuracy of 99% using a filter having pores having a diameter of 1 μm. In contrast, a ceramic slurry was produced under the same conditions as those in Example 1 apart from the fact that 10 parts by weight of the acrylic binder was formulated as it was.

The dispersibility of the ceramic slurry produced in accordance with the method in Comparative Example 1 was evaluated using a Microtrack particle size distribution tester. As a result, D90 was 0.46 μm.

After the ceramic slurry was dried and heated to 500° C. to remove the binder, the specific surface was measured, and the increase in the original specific surface was 7.8%.

Using the ceramic slurry, a ceramic green sheet was formed in a manner similar to that in Example 1.

The surface roughness (Ra) of the resulting ceramic green sheet was observed using an atomic force microscope, and the density ratio of measured density to theoretical density (measured density/theoretical density) of the ceramic green sheet was found. As a result, Ra was 63 nm and the density ratio was 0.97.

Next, using the ceramic green sheet, a monolithic ceramic capacitor was fabricated in a manner similar to that in Example 1.

The short circuiting rate of the resulting monolithic ceramic capacitor was 18%, which was high. The temperature characteristics of capacitance satisfied X7R.

COMPARATIVE EXAMPLE 2

A ceramic slurry was produced under the same conditions as those in Example 1 apart from the fact that a sand mill was used instead of the high pressure dispersing apparatus used in either one of Examples 1 to 9 described above.

The dispersibility of the ceramic slurry produced in accordance with the method in Comparative Example 2 was evaluated using a Microtrack particle size distribution tester.

As a result, D90 was 0.62 μm. After the ceramic slurry was dried and heated to 500° C. to remove the binder, the specific surface was measured, and the increase in the original specific surface was 30.3%.

Using the ceramic slurry, a ceramic green sheet was formed in a manner similar to that in Example 1.

The surface roughness (Ra) of the resulting ceramic green sheet was observed using an atomic force microscope, and the density ratio of measured density to theoretical density (measured density/theoretical density) was found. As a result, Ra was 113 nm and the density ratio was 0.84.

Next, using the ceramic green sheet, a monolithic ceramic capacitor was fabricated in a manner similar to that in Example 1.

The short circuiting rate of the resulting monolithic ceramic capacitor was 51%, which was high. The temperature characteristics of capacitance did not satisfy X7R.

COMPARATIVE EXAMPLE 3

A ceramic slurry was produced under the same conditions as those in Example 1 apart from the fact that the pressure was changed from 1,300 kg/cm$^2$ to 50 kg/cm$^2$ when the slurry was dispersed by a high pressure dispersing apparatus, and a ceramic green sheet was formed using the ceramic slurry.

The dispersibility of the ceramic slurry produced in accordance with the method in Comparative Example 3 was evaluated using a Microtrack particle size distribution tester. As a result, D90 was 0.61 μm. After the ceramic slurry was dried and heated to 500° C. to remove the binder, the specific surface was measured, and the increase in the original specific surface was 7.2%.

Using the ceramic slurry, a ceramic green sheet was formed in a manner similar to that in Example 1.

The surface roughness (Ra) of the resulting ceramic green sheet was observed using an atomic force microscope, and the density ratio of measured density to theoretical density (measured density/theoretical density) was found. As a result, Ra was 111 nm and the density ratio was 0.82.

Next, using the ceramic green sheet, a monolithic ceramic capacitor was fabricated in a manner similar to that in Example 1.

The short circuiting rate of the resulting monolithic ceramic capacitor was 46%, which was high. The temperature characteristics of capacitance satisfied X7R.

COMPARATIVE EXAMPLE 4

A ceramic slurry was produced under the same conditions as those in Example 1 apart from the fact that the amount of the dispersant (anionic dispersant) added had been changed from 2 parts by weight to 0.2 part by weight, the total acid amount of the dispersant being 4.8% of the total base amount of the powder.

The dispersibility of the ceramic slurry thus obtained was evaluated using a Microtrack particle size distribution tester. As a result, D90 was 0.59 μm. After the ceramic slurry was dried and heated to 500° C. to remove the binder, the specific surface was measured, and the increase in the original specific surface was 9.9%.

By molding the ceramic slurry into a sheet by a doctor blade process, a ceramic green sheet was formed.

The surface roughness (Ra) of the resulting ceramic green sheet was observed using an atomic force microscope, and the density ratio of measured density to theoretical density (measured density/theoretical density) was found. As a result, Ra was 109 nm and the density ratio was 0.81.

Next, using the ceramic green sheet, a monolithic ceramic capacitor was fabricated in a manner similar to that in Example 1.

The short circuiting rate of the resulting monolithic ceramic capacitor was 22%, which was high. The temperature characteristics of capacitance did not satisfy X7R.

Table 1 below summarizes the dispersibility of the ceramic slurry (final dispersed slurry), the increase in the specific surface after the removal of the binder, the surface roughness of the resulting ceramic green sheet, the density ratio and the short circuiting rate and temperature characteristics of capacitance of the monolithic ceramic capacitor fabricated using the ceramic green sheet with respect to Examples 1 to 9 and Comparative Examples 1 to 4.

It is to be understood that the present invention is not limited to the embodiments and examples described above. Within the scope while not deviating from the object of the present invention, various alterations and modifications can be made with respect to the types of the ceramic powder and dispersing medium, the type of the dispersion process using a pulverizing medium, the specific structure of the high pressure dispersing apparatus used for performing high pressure dispersion, the types and amounts of addition for the dispersant, plasticizer, antistatic agent, etc.

As described above, in accordance with a method for producing a ceramic slurry in the present invention, by using the filtered binder solution which is prepared by dissolving the binder in the solvent, followed by filtration, it is possible to reliably remove the undissolved binder which is likely to generate imperfections, and it is possible to homogeneously disperse the ceramic powder without excessive damage to the ceramic powder, and it is also possible to efficiently produce a ceramic slurry suitable for use in fabricating ceramic electronic components in which occurrence of imperfections is decreased.

In accordance with the method for producing the ceramic slurry in the present invention, the ceramic powder having an average particle size of about 0.01 to 1 μm, the solvent and the dispersant are mixed and pulverized by the dispersion process using the pulverizing medium, such as balls or beads, to prepare the mixed and pulverized slurry, and after the filtered binder solution, which is prepared by dissolving the binder in the solvent, followed by filtration, is added to the mixed and pulverized slurry, dispersion is performed at a high pressure of about 100 kg/cm$^2$ or more, and thus it is possible to obtain a ceramic slurry in which the ceramic powder is satisfactorily dispersed.

That is, by dispersing the ceramic powder by combining the dispersion process using the pulverizing medium and the high pressure dispersion process, it is possible to homogeneously disperse the ceramic powder without damaging the crystallinity of the ceramic powder while at the same time inhibiting the specific surface from being excessively increased, and simultaneously, by using the filtered binder solution, it is possible to efficiently produce a ceramic slurry suitable for use in fabricating ceramic electronic components in which occurrence of imperfections is decreased.

In accordance with another method for producing a ceramic slurry in the present invention, the filtered binder solution prepared by dissolving the binder in the solvent, followed by filtration, the ceramic powder having an average particle size of about 0.01 to 1 μm, the solvent and the dispersant are mixed and pulverized by the dispersion process using the pulverizing medium, such as balls or beads, to obtain the mixed and pulverized slurry, and then the mixed and pulverized slurry is dispersed at a high pressure of about 100 kg/cm² or more. In such a case, the same effects as those in the method previously described can be obtained.

In accordance with another method for producing a ceramic slurry in the present invention, the ceramic powder, the solvent and the dispersant are mixed and pulverized by the dispersion process using the pulverizing medium to obtain the mixed and pulverized slurry, the mixed and pulverized slurry is subjected to high pressure dispersion (primary high pressure dispersion) at a pressure of about 100 kg/cm² or more, and high pressure dispersion (secondary high pressure dispersion) is further performed at a pressure of about 100 kg/cm² or more. In such a case, it is also possible to homogeneously disperse the ceramic powder without excessively damaging the ceramic powder, and thus a ceramic slurry of high quality can be produced.

In accordance with another method for producing a ceramic slurry in the present invention, the ceramic powder, the solvent and the dispersant are mixed and pulverized by the dispersion process using the pulverizing medium to obtain the primary mixed and pulverized slurry, after the filtered binder solution is added to the primary mixed and pulverized slurry, mixing and pulverizing are performed again to obtain the secondary mixed and pulverized slurry, and the secondary mixed and pulverized slurry is dispersed at a high pressure of about 100 kg/cm² or more. In such a case, it is also possible to homogeneously disperse the ceramic powder without excessively damaging the ceramic powder, and thus a ceramic slurry of high quality can be produced.

By using the filtered binder solution prepared by mixing the solvent and the binder and performing high pressure dispersion at a pressure of about 100 kg/cm² or more, followed by filtration, gels which may be generated when the binder is directly added or when the binder dissolved in the solvent is added without filtration, can be prevented from occurring and thus the dispersibility of the ceramic powder can be further improved.

By using the filtered binder solution prepared by refluxing the binder solution comprising the mixture of the solvent and the binder at about 40 to 100° C., followed by filtration, the binder can be more reliably dissolved, and the binder can be added without generating imperfections or micrometer-size agglomerates, and it is also possible to improve the dispersibility of the ceramic powder.

By using the filtered binder solution prepared by filtering at a filtration cutoff accuracy of about 99% using the filter having pores having a diameter of about 2 μm or less, it is possible to reliably remove the undissolved binder, thus making the present invention more effective.

If the viscosity of the dispersed slurry (final dispersed slurry) is set at about 0.003 to 0.1 Pa·s, it is possible to produce a ceramic slurry which is suitable in use for molding into a sheet to produce a ceramic green sheet, thus making the present invention more effective.

If the ball mill or the bead mill is employed in the dispersion process using the pulverizing medium, flocculated ceramic particles can be reliably pulverized, thus making the present invention more effective.

By using an anionic dispersant as the dispersant and by setting the amount thereof to be added so that the total acid amount of the anionic dispersant is about 10 to 150% of the total base amount of the ceramic powder, it is possible to disperse the ceramic slurry more efficiently, thus making the present invention more effective.

By preventing material having a particle size greater than the thickness of the ceramic green sheet to be formed from being present in the ceramic slurry (final dispersed slurry), when the ceramic green sheet is formed by molding the ceramic slurry into a sheet, it is possible to reliably obtain a ceramic green sheet having superior smoothness and uniformity without protrusions or the like on the surface.

By filtering the ceramic slurry at a filtration cutoff accuracy of about 99% using the filter having pores having a diameter less than about 5 times the thickness of the ceramic green sheet, when the ceramic slurry is molded into a sheet to produce the ceramic green sheet, it is possible to prevent protrusions from occurring in the surface due to the inclusion of a material having a particle size greater than the thickness of the ceramic green sheet to be formed, and a ceramic green sheet having superior smoothness and uniformity can be reliably obtained.

In accordance with a method for forming a ceramic green sheet in the present invention, a ceramic green sheet having a thickness of about 0.1 to 10 μm is formed by molding the ceramic slurry produced by any one of the methods described above into a sheet on a predetermined base. In the ceramic slurry produced by any one of the methods described above, a ceramic powder having an average particle size of about 0.01 to 1 μm is sufficiently dispersed in the dispersing medium, and by molding the ceramic slurry into a sheet, it is possible to form a thin ceramic green sheet (about 0.1 to 5 μm thick) having superior surface smoothness, high density and high tensile strength, in which resins, such as a binder and a plasticizer, are homogeneously dispersed and which is suitable for use in fabricating a monolithic ceramic electronic component.

In accordance with a method for fabricating a monolithic ceramic electronic component in the present invention, ceramic green sheets are formed using a ceramic slurry produced by any one of the methods described above, the ceramic green sheets together with internal electrodes composed of a base metal were laminated, followed by dicing and firing, and external electrodes are then formed. Thus, it is possible to reliably fabricate a reliable monolithic ceramic electronic component, in which the short circuiting rate is decreased. Since the ceramic powder is not greatly damaged, it is possible to improve the reproducibility of the targeted characteristics.

What is claimed is:

1. A method for producing a ceramic slurry used for fabricating a ceramic electronic component comprising:

pulverizing a combination comprising a ceramic powder having an average particle size of about 0.01 to 1 μm, a solvent and a dispersant by a process using a pulverizing medium to obtain a pulverized slurry; and dispersing the pulverized slurry and a filtered binder solution at a pressure of about 100 kg/cm² or more to obtain a final dispersed slurry, wherein the binder solution comprises a filtered solution of binder and solvent.

2. A method for producing a ceramic slurry used for fabricating a ceramic electronic component according to claim 1, wherein the filtered binder solution is present during the pulverizing.

3. A method for producing a ceramic slurry used for fabricating a ceramic electronic component according to claim 1, wherein the pulverized slurry is dispersed at a pressure of 100 kg/cm² or more to obtain a primary dispersed slurry prior to dispersing the pulverized slurry and a filtered binder solution at a pressure of about 100 kg/cm² or more to obtain the final dispersed slurry.

4. A method for producing a ceramic slurry used for fabricating a ceramic electronic component according to claim 1, wherein a combination of pulverized slurry and filtered binder solution are pulverized by a dispersion process using a pulverizing medium to obtain a secondary pulverized slurry, and the secondary pulverized slurry is dispersed at a pressure of about 100 kg/cm$^2$ or more to obtain the final dispersed slurry.

5. A method for producing a ceramic slurry according to claim 1, further comprising preparing the filtered binder solution by combining solvent and binder and performing high pressure dispersion of the combination at a pressure of about 100 kg/cm$^2$ or more, and filtering the resulting dispersion.

6. A method for producing a ceramic slurry according to claim 1, comprising preparing the filtered binder solution by refluxing a binder solution comprising a mixture of solvent and binder at about 40 to 100° C., and filtering the resulting solution.

7. A method for producing a ceramic slurry according to claim 1, wherein the filtered binder solution contains at least about 99% of material passing through a filter which has pores having a diameter of about 2 $\mu$m or less.

8. A method for producing a ceramic slurry according to claim 1, wherein the material and processing employed are such that the final dispersed slurry has a viscosity of about 0.003 to 0.1 Pa·s.

9. A method for producing a ceramic slurry according to claim 1, wherein the pulverizing using the pulverizing medium is effected in a ball mill or a bead mill.

10. A method for producing a ceramic slurry according to claim 1, wherein the dispersant is an anionic dispersant and the amount thereof is such that the total acid amount of the anionic dispersant is about 10 to 150% of the total base amount of the ceramic powder.

11. A method for producing a ceramic slurry according to claim 10, wherein the anionic dispersant is a polycarboxylic acid or polymaleic acid dispersant which is free of metallic ions.

12. A method for producing a ceramic green sheet, comprising forming the final dispersed slurry ceramic slurry according to claim 1 into a ceramic green sheet.

13. A method for producing a ceramic green sheet according to claim 12, wherein the ceramic green sheet has a predetermined thickness and prior to the forming, the final dispersed slurry is filtered at a filtration cutoff accuracy of about 99% using a filter having pores having a diameter less than about 5 times the thickness of a ceramic green sheet to be formed.

14. A method for forming a ceramic green sheet according to claim 13, wherein the predetermined thickness is about 0.1 to 10 $\mu$m.

15. A method for forming a ceramic green sheet according to claim 14, wherein the forming comprises molding the final dispersed ceramic slurry into sheet form on a substrate.

16. A method for fabricating a monolithic ceramic electronic component comprising the steps of forming a plurality of ceramic green sheets comprising a ceramic slurry produced by the method according to claim 1; laminating a plurality of ceramic green sheets together with at least two internal electrodes each of which comprises a base metal disposed between adjacent green sheets; firing the laminate so formed; and forming external electrodes on the fired laminate.

17. A method for fabricating a monolithic ceramic electronic component comprising the steps of forming a plurality of ceramic green sheets comprising a ceramic slurry produced by the method according to claim 2; laminating a plurality of ceramic green sheets together with at least two internal electrodes each of which comprises a base metal disposed adjacent green sheets; firing the laminate so formed; and forming external electrodes on the fired laminate.

18. A method for fabricating a monolithic ceramic electronic component comprising the steps of forming a plurality of ceramic green sheets comprising a ceramic slurry produced by the method according to claim 3; laminating a plurality of ceramic green sheets together with at least two internal electrodes each of which comprises a base metal disposed between adjacent green sheets; firing the laminate so formed; and forming external electrodes on the fired laminate.

19. A method for fabricating a monolithic ceramic electronic component comprising the steps of forming a plurality of ceramic green sheets comprising a ceramic slurry produced by the method according to claim 4; laminating a plurality of ceramic green sheets together with at least two internal electrodes each of which comprises a base metal disposed between adjacent green sheets; firing the laminate so formed; and forming external electrodes on the fired laminate.

20. A method for fabricating a monolithic ceramic electronic component comprising the steps of forming a plurality of ceramic green sheets comprising a ceramic slurry produced by the method according to claim 14; laminating a plurality of ceramic green sheets together with at least two internal electrodes each of which comprises a base metal disposed between adjacent green sheets; firing the laminate so formed; and forming external electrodes on the fired laminate.

* * * * *